UNITED STATES PATENT OFFICE.

PRESTON R. MANSFIELD, OF DEDHAM, AND GEORGE O. BOYNTON, OF BOSTON, MASSACHUSETTS.

EMERY-WHEEL.

SPECIFICATION forming part of Letters Patent No. 305,210, dated September 16, 1884.

Application filed February 9, 1884. (No specimens.)

*To all whom it may concern:*

Be it known that we, PRESTON R. MANSFIELD and GEORGE O. BOYNTON, respectively of Dedham and Boston, in the counties of Norfolk and Suffolk and State of Massachusetts, have invented certain new and useful Improvements in Emery-Wheels, of which the following is a full, clear, and exact description.

This invention relates to a tool or implement or other article, preferably in the form of a wheel, for cutting, grinding, and polishing metals and substances, more especially hard metals; and the invention consists in making such tool or implement of paper-pulp, preferably of wood pulp, and combining with it emery or sand or alumina, or other suitable granulated substance or substances, and either separately or in combination, each one with another or with each other, and then with tungstate of soda, sulphuric acid, and glue, all substantially as hereinafter fully described.

In carrying out this invention, first take one hundred (100) pounds of paper-pulp, wood pulp being preferable, and put it in a suitable vessel with sufficient water to cover the pulp, and then place the kettle over a fire with sufficient heat to boil the pulp. Then put fifty (50) pounds of tungstate of soda in another suitable vessel and pour one (1) pound of sulphuric acid (which has first been diluted with water—say about five times its weight of water) over the same, and thoroughly mix the two together, and to this add sixteen (16) pounds of glue which has been prepared with water in the usual manner, and then add two hundred and forty (240) pounds of emery, and fully and thoroughly mix the whole together, and when so mixed let it stand about twelve (12) or fourteen (14) hours to allow the carbonic-acid gas to escape. Then add this compound of tungstate of soda, sulphuric acid, glue, and emery to the pulp while it is hot, and putting the whole in a suitable tank having any suitable agitator, agitate and stir the whole thoroughly together. After suitable agitation the compound is then ready to be made or molded or formed into the shape of the tool or implement, which, for the purposes of this invention, is preferably in the form of a wheel. The compound is placed in the mold of the shape and size desired, and the mold placed in a suitable press, where it is pressed with the desired and sufficient pressure to make it firm, compact, and solid, after which it is removed from the mold and allowed to dry in the atmosphere, when it is ready for use.

In lieu of emery, sand, quartz, alumina, or other granulated substance or substances can be used, and either alone or in combination one with another or with each other; also, any suitable adhesive material can be used instead of glue. It is also preferable to use paper-pulp made from wood, although pulp made from any suitable material can be used with good results.

The proportions herein named of the several ingredients can be varied somewhat without departing from this invention, and yet produce good results, and they may be combined together in other ways than as herein stated, but as herein described is satisfactory and practical. It is preferable to have about twenty per centum of the emery of finer particles, as in pressing the compound in the mold the emery will lie closer together, the finer particles filling up the spaces between the coarser particles, by which a much smoother surface is given to the tool.

A tool or instrument constructed as hereinabove described is very hard, and is especially applicable in grinding or polishing hard metal, as iron, steel, &c.

Having thus described our invention, what we claim is—

1. The composition consisting of paper-pulp and emery or sand, alumina, or other suitable granulated material, either separately or in combination one with another or with each other, tungstate of soda, sulphuric acid, and glue, substantially as and for the purpose specified.

2. As a new article of manufacture, an emery-wheel composed of paper-pulp, emery, tungstate of soda, sulphuric acid, and glue, substantially as described.

In testimony whereof we have hereunto set our hands in the presence of two subscribing witnesses.

PRESTON R. MANSFIELD.
GEORGE O. BOYNTON.

Witnesses:
EDWIN W. BROWN,
WM. S. BELLOWS.